US012562373B2

(12) United States Patent
Yilmaz et al.

(10) Patent No.: US 12,562,373 B2
(45) Date of Patent: Feb. 24, 2026

(54) PROCESS FOR PREPARING ELECTROACTIVE MATERIALS FOR USE IN METAL-ION BATTERIES

(71) Applicant: Nexeon Limited, Abingdon (GB)

(72) Inventors: Sefa Yilmaz, Moses Lake, WA (US);
Kseniia Katok, Wokingham (GB);
Richard Gregory Taylor, Penarth
(GB); Jose Medrano, Abingdon (GB);
Silo Meoto, Abingdon (GB)

(73) Assignee: NEXEON LIMITED, Abingdon (GB)

( * ) Notice: Subject to any disclaimer, the term of this
patent is extended or adjusted under 35
U.S.C. 154(b) by 1022 days.

(21) Appl. No.: 17/641,929

(22) PCT Filed: Sep. 10, 2020

(86) PCT No.: PCT/GB2020/052190
§ 371 (c)(1),
(2) Date: Mar. 10, 2022

(87) PCT Pub. No.: WO2021/048557
PCT Pub. Date: Mar. 18, 2021

(65) Prior Publication Data
US 2022/0344636 A1      Oct. 27, 2022

(30) Foreign Application Priority Data
Sep. 10, 2019 (GB) ..................................... 1913065

(51) Int. Cl.
| | |
|---|---|
| H01M 4/587 | (2010.01) |
| C04B 35/528 | (2006.01) |
| C04B 35/628 | (2006.01) |
| H01M 4/36 | (2006.01) |
| H01M 4/38 | (2006.01) |
| H01M 4/02 | (2006.01) |

(52) U.S. Cl.
CPC ........... *H01M 4/364* (2013.01); *C04B 35/528*
(2013.01); *C04B 35/62802* (2013.01); *C04B*
*35/62884* (2013.01); *H01M 4/366* (2013.01);
*H01M 4/386* (2013.01); *H01M 4/587*
(2013.01); *C04B 2235/422* (2013.01); *C04B*
*2235/428* (2013.01); *C04B 2235/77* (2013.01);
*H01M 2004/021* (2013.01)

(58) Field of Classification Search
None
See application file for complete search history.

(56) References Cited

U.S. PATENT DOCUMENTS

| | | | |
|---|---|---|---|
| 2006/0197063 A1* | 9/2006 | Tennison | C04B 35/6267 |
| | | | 264/642 |
| 2017/0170477 A1* | 6/2017 | Sakshaug | H01M 4/587 |

FOREIGN PATENT DOCUMENTS

| | | |
|---|---|---|
| DE | 102014211012 | 12/2015 |
| GB | 1042478 | 9/1966 |
| GB | 2587326 | 3/2021 |
| WO | 2017/040299 A1 | 3/2017 |
| WO | 2017/140645 A1 | 8/2017 |
| WO | 2018/145733 A1 | 8/2018 |
| WO | 2020/095067 A1 | 5/2020 |
| WO | 2020/128495 A1 | 6/2020 |
| WO | 2021048557 | 3/2021 |

OTHER PUBLICATIONS

"International Application Serial No. PCT GB2020 052190, International Preliminary Report on Patentability mailed Mar. 24, 2022", 9 pgs.
"United Kingdom Application Serial No. 1913065.7, Office Action mailed Nov. 26, 2019", 8 pgs.
"United Kingdom Application Serial No. 1913065.7, Response filed Mar. 4, 2020 to Office Action mailed Nov. 26, 2019", 25 pgs.
"United Kingdom Application Serial No. 1913065.7, Office Action mailed Oct. 8, 2019", 2 pgs.
International Search Report mailed on Oct. 28, 2020, issued in connection with International Application No. PCT/GB2020/052190, filed on Sep. 10, 2020, 4 pages.
Written Opinion mailed on Oct. 28, 2020, issued in connection with International Application No. PCT/GB2020/052190, filed on Sep. 10, 2020, 7 pages.

* cited by examiner

*Primary Examiner* — Tanisha Diggs
(74) *Attorney, Agent, or Firm* — Schwegman Lundberg &
Woessner, P.A.

(57) ABSTRACT

The invention relates to a process for preparing silicon-containing composite particles in a fluidized bed. Porous conductive particles having a defined particle size and pore structure are combined with a particulate additive having defined particle size, density and BET surface area. The combined porous conductive particles and particulate additive are subjected to chemical vapour infiltration in a fluidised bed to cause deposition of silicon in the pores of the porous conductive particles.

17 Claims, No Drawings

PROCESS FOR PREPARING ELECTROACTIVE MATERIALS FOR USE IN METAL-ION BATTERIES

This invention relates to a process for preparing silicon-containing composite particles. The silicon-containing composite particles provide improved performance when used as electroactive materials in rechargeable metal-ion batteries.

Rechargeable metal-ion batteries are widely used in portable electronic devices such as mobile telephones and laptop computers. Rapid developments in electric and hybrid vehicle technology also represent a significant new market for high-performance rechargeable batteries. The anode of a metal-ion battery typically comprises a metal current collector provided with a layer of an electroactive material (which is defined herein as a material which is capable of inserting and releasing metal ions during the charging and discharging of a battery). When a metal-ion battery is charged, metal ions are transported from the metal-ion-containing cathode layer via the electrolyte and are inserted into the anode material.

Conventional lithium-ion batteries use graphite as the electroactive material in the anode. When a graphite-containing anode is charged, lithium intercalates between the graphite layers to form a material with the empirical formula $Li_xC_6$ (wherein x is greater than 0 and less than or equal to 1). This means that graphite has a maximum theoretical capacity of 372 mAh/g in a lithium-ion battery, with a practical capacity that is somewhat lower (ca. 340 to 360 mAh/g). The development of portable electronics and electric vehicles with high energy demands means that there is a need for electroactive materials that provide an improvement in the gravimetric and volumetric capacity of graphite.

Materials such as silicon, tin and germanium have a significantly higher capacity for inserted lithium atoms than graphite. Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$).

The high specific capacity of silicon is accompanied by large volumetric changes on charging and discharging. Intercalation of lithium into bulk silicon leads to an increase in the volume of the silicon material of up to 400% of its original volume. Repeated charge-discharge cycles therefore cause significant mechanical stress in the silicon material, resulting in fracturing and delamination of the silicon anode material and deformation of other battery components. The contraction of silicon particles upon delithiation can result in a loss of electrical contact between the anode material and the current collector. A further problem is that a solid electrolyte interphase (SEI) layer forms on fresh silicon surfaces during the initial charging cycle as a result of electrolyte deposition. This SEI layer does not have sufficient mechanical tolerance to accommodate the expansion and contraction of the silicon and delaminates from the silicon surface. Newly exposed silicon surfaces then lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. One approach is to use some form of finely structured silicon as the electroactive material. Fine silicon structures below around 150 nm in cross-section, such as silicon films and silicon nanoparticles, are more tolerant of volume changes on charging and discharging when compared to silicon particles in the micron size range. However, neither of these is particularly suitable for commercial scale applications in their unmodified form; nanoscale particles are difficult to prepare and handle and silicon films do not provide sufficient bulk capacity. The relatively high surface area of finely structured silicon also results in unacceptable capacity loss on the first charging cycle due to excessive SEI formation.

To address the need for viable silicon-containing electroactive materials, this application describes a process for preparing a composite material in which silicon is deposited in the pores of a porous conductive material (e.g. a carbon-containing porous material, such as an activated carbon material). The present applicant has already identified that through careful control of the total pore volume, the pore size distribution of the porous conductive material, and the weight ratio of silicon to the porous conductive material, it is possible to obtain a material with controlled expansion properties, limited SEI formation, and high reversible capacity retention. These composite materials therefore provide the beneficial charge-discharge properties of nanoscale silicon particles while avoiding the handling difficulties and capacity loss associated with nanoparticles.

This invention relates to a process which allows these composite materials to be prepared on a scale which is suitable for commercial manufacture and which provides a high quality product with uniformity of composition and performance.

Chemical vapour infiltration (CVI) is a process of infiltrating a porous material with an additional phase, typically by passing a mixture of carrier gases and a reactive gaseous precursor through the porous substrate at high temperature. Decomposition/reaction of the reactive gaseous precursor on pore surfaces results in the deposition of a solid phase in the pore structure. Suitable gaseous precursors for the deposition of silicon include silane ($SiH_4$) and trichlorosilane ($SiHCl_3$). CVI is of particular utility for preparing the electroactive materials disclosed herein since it results in very little damage to the geometry of the porous substrate. However, a problem with the use of CVI on a large scale is that local variations in temperature and mass transfer within the CVI reactor result in insufficient product homogeneity and thus impaired electrochemical performance. There are not believed to be any commercialised examples of the use of CVI as a deposition technique for porous materials having particle sizes of the order of a few tens of micrometres.

Fluidized bed reactors (FBRs) are commonly used in industry for processes which demand a high level of thermal and mass transfer homogeneity. FBRs use a gas flow at sufficient velocity to suspend a bed of granular material such that it behaves similarly to a fluid. Due to the fluid-like behaviour of the granular material, FBR processes provide effective particle mixing, uniform temperature gradients and a high level of gas-solid contact. Together these factors can help to provide a more uniform product than can be typically be achieved with other reactor designs, such as fixed or rotating bed reactors.

This makes FBRs a superficially attractive approach for the preparation of the silicon-containing composite materials described above. However, highly porous conductive particles, such as porous carbon particles, in an appropriate size range (e.g. 30 μm or less) are highly cohesive due their small size and low density and are therefore difficult to fluidize under normal conditions. Essentially, the gas flow is not strong enough to break apart the cohesive forces between the porous conductive particles, and so the particles agglomerate together and the gas flow forms channels through the bed which bypass most of the granular material. In addition to channeling behaviour, the particle bed may demonstrate bubbling and slugging behaviours ("slugging" refers to the formation of large bubbles which cover essentially the entire diameter of a fluidized bed) resulting in a fluctuating bed as the slugs/bubbles form and burst.

In UK patent application no. 1821011.2 (unpublished), the present applicant has proposed a process in which CVI in a fluidized bed is used to deposit silicon into porous carbon-containing particles of larger size than is appropriate for use in electrodes for metal-ion batteries. The larger particle size means that the particles are less cohesive and may be fluidized successfully. However, the fluidized bed CVI process must be followed by a comminution step (e.g. a ball milling step) to reduce the particle size of the silicon-carbon composite material. While this provides an effective solution, it nonetheless involves an additional processing step with associated capital and running costs. It would therefore be useful to identify a method of preparing silicon-containing composite materials of appropriate dimensions for use in electrodes for metal-ion batteries that has the advantages of fluidized bed reactors but without the need for a comminution step.

Although it is known in principle that fluidization behaviour of particulate materials may be modified by adding supplemental particulate materials, this causes particular difficulties in the case of using CVI to prepare electroactive materials. Many particulate additives fall within the same particle size range as the target materials and therefore cannot be easily separated from the target product, resulting in a low specification product which is unacceptable to battery manufacturers. However, particulate additives of larger size can become segregated from the porous particles, which do not then form a stable fluidized bed. Still a further issue is that the CVI process itself modifies the density and surface chemistry of the porous particles meaning that the specification of a particulate additive can change depending on the extent of reaction.

In a first aspect of the invention, there is provided a process for preparing silicon-containing composite particles in a fluidized bed, the process comprising the steps of:
- (a) providing a plurality of porous conductive particles comprising micropores and/or mesopores, wherein:
  - (i) the $D_{50}$ particle diameter of the porous conductive particles is in the range from 1 to 30 μm;
  - (ii) the total pore volume of micropores and mesopores as measured by gas adsorption is in the range from 0.4 to 2.2 $cm^3/g$;
  - (iii) the $PD_{50}$ pore diameter as measured by gas adsorption is no more than 10 nm;
- (b) combining the porous conductive particles with a particulate additive having a $D_{50}$ particle diameter in the range from 40 to 300 μm, particle density in the range from 1.3 to 6 $g/cm^3$ and BET surface area of no more than 200 $m^2/g$, wherein the mass ratio of the porous conductive particles to the particulate additive is from 95:5 to 70:30; and
- (c) passing a fluidizing gas comprising a silicon precursor gas through the combined porous conductive particles and particulate additive at a gas velocity effective to cause fluidization of the combined porous conductive particles and particulate additive, and at a temperature effective to cause deposition of silicon in the pores of the porous conductive particles.

Research by the present inventors has found that porous conductive particles of within the particle size range set out above may be successfully processed by CVI in a fluidized bed when used in admixture with particulate additives of a controlled specification. In particular, it has been found that the porous conductive particles of low particle size may be successfully fluidized in admixture with particulate additives having carefully controlled particle size, density and BET surface area. The particle size of the particulate additive is carefully selected to lie outside of the target product particle size range, thereby to facilitate separation of the particulate additive from the silicon-containing composite particle product. Furthermore, within the density and BET surface area ranges set out herein, it is found that even these larger size particulate additives enable effective fluidizing of the porous conductive particles throughout the duration of the CVI process. Thus, the process disclosed herein furthermore tolerates the density change of the porous conductive particles upon silicon deposition without impairing fluidisation. As a further advantage of the claimed process, the low surface area of the particulate additive reduces the possibility of silicon deposition onto the particulate additive instead of the porous conductive particles. The reaction kinetics of the CVI process favour deposition of silicon into small pores and therefore the low BET surface area of the particulate additive ensures that silicon is deposited preferentially into the pores of the porous conductive particles.

Accordingly, the process of the invention utilises the advantages of CVI and fluidized bed reactors for depositing an electroactive material into pores of porous conductive particles, thus providing a silicon-containing composite material of high uniformity which is suitable for use as a high performance electroactive material in metal-ion batteries. The process furthermore avoids the need for a comminution step. Instead, a significantly simpler separation step (e.g. using sieving or air classification) may optionally be used to separate the composite particles from the particulate additive following step (c). The process of the invention thus provides an effective process for preparing composite particles which is suitable for large-scale commercial use.

For the avoidance of doubt, the term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

Particle diameters and particle size distributions can be determined by standard laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photo-detector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

In general, the porous conductive particles have a $D_{50}$ particle diameter in the range from 1 to 30 μm. Optionally, the $D_{50}$ particle diameter of the porous conductive particles may be at least 1.5 μm, or at least 2 μm, or at least 3 μm, or at least 4 μm, or at least 5 μm. Optionally the $D_{50}$ particle diameter of the porous conductive particles may be no more than 25 μm, or no more than 20 μm, or no more than 18 μm, or no more than 15 μm, or no more than 12 μm, or no more than 10 μm.

For instance, the porous conductive particles may have a $D_{50}$ particle diameter in the range from 1 to 25 μm, or from 1 to 20 μm, or from 2 to 25 μm, or from 2 to 20 μm, or from 2 to 18 μm, or from 3 to 20 μm, or from 3 to 18 μm, or from 3 to 15 μm, or from 4 to 18 μm, or from 4 to 15 μm, or from 4 to 12 μm, or from 5 to 15 μm, or from 5 to 12 μm or from 5 to 10 μm. Particles within these size ranges and having porosity and a pore diameter distribution as set out herein are ideally suited for the preparation of composite particles for use in anodes for metal-ion batteries by a fluidized bed process. Not only do these particles provides good fluidization properties throughout the deposition process, but the composite particles thus formed have good dispersibility in slurries, structural robustness, high capacity retention over repeated charge-discharge cycles, and are suitable for forming dense electrode layers of uniform thickness in the conventional thickness range from 20 to 50 μm.

The $D_{10}$ particle diameter of the porous conductive particles is preferably at least 0.2 μm, or at least 0.5 μm, or at least 0.8 μm, or at least 1 μm, or at least 1.5 μm, or at least 2 μm. By maintaining the $D_{10}$ particle diameter at 0.2 μm or more, the potential for undesirable agglomeration of sub-micron sized particles is reduced, resulting in improved fluidization behaviour, and improved dispersibility of the composite particles formed.

The $D_{90}$ particle diameter of the porous conductive particles is preferably no more than 40 μm, or no more than 30 μm, or no more than 25 μm, or no more than 20 μm. The use of larger porous conductive particles as the starting material complicates separation of the composite particles from the particulate additive. It also results in non-uniform forming packing of the composite particles in electrode active layers, thus disrupting the formation of dense electrode layers, particularly electrode layers having a thickness in the range from 20 to 50 μm.

More preferably, the $D_{99}$ particle diameter of the porous conductive particles is no more than 40 μm, or no more than 30 μm, or no more than 25 μm, or no more than 20 μm.

The porous conductive particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

The porous conductive particles preferably have a positive skew in the volume-based distribution, for example, such that the volume based distribution is asymmetric with a longer tail on the right hand side. Preferably, the skew of the porous conductive particle size distribution (as measured by a Malvern Mastersizer™ 3000 analyzer) is no more than 5, or no more than 3.

The porous conductive particles may have an average sphericity (as defined herein) of at least 0.5, or at least 0.55. Preferably the average sphericity is at least 0.65, or at least 0.7, or at least 0.75, or at least 0.8.

It is possible to obtain highly accurate two-dimensional projections of micron scale particles by scanning electron microscopy (SEM) or by dynamic image analysis, in which a digital camera is used to record the shadow projected by a particle. The term "sphericity" as used herein shall be understood as the ratio of the area of the particle projection (obtained from such imaging techniques) to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n} \sum_{i=1}^{n} \left[ \frac{4 \cdot \pi \cdot A_m}{(C_m)^2} \right]$$

wherein n represents the number of particles in the population. The average sphericity for a population of particles is preferably calculated from the two-dimensional projections of at least 50 particles. It is believed that a porous conductive particles with a positive skew and a sphericity of at least 0.5 will help to ensure a more uniform silicon infiltration during fluidization and provide a composite product with a higher packing density in the electrode.

The porous conductive particles comprise a three-dimensionally interconnected open pore network comprising micropores and/or mesopores and optionally a minor volume of macropores. In accordance with conventional IUPAC terminology, the term "micropore" is used herein to refer to pores of less than 2 nm in diameter, the term "mesopore" is used herein to refer to pores of 2-50 nm in diameter, and the term "macropore" is used to refer to pores of greater than 50 nm diameter.

References herein to the volume of micropores, mesopores and macropores in the porous conductive particles, and also any references to the distribution of pore volume within the porous conductive particles, relate to the internal pore volume of the porous conductive particles used as the starting material in step (a) of the claimed process, i.e. prior to deposition of silicon into the pore volume in step (c).

The porous conductive particles are characterised by a total volume of micropores and mesopores (i.e. the total pore volume in the range from 0 to 50 nm) in the range from 0.4 to 2.2 $cm^3/g$. Typically, the porous conductive particles include both micropores and mesopores. However, it is not excluded that porous conductive particles may be used which include micropores and no mesopores, or mesopores and no micropores.

More preferably, the total volume of micropores and mesopores in the porous conductive particles is at least 0.45 $cm^3/g$, or at least 0.5 $cm^3/g$, at least 0.55 $cm^3/g$, or at least 0.6 $cm^3/g$, or at least 0.65 $cm^3/g$, or at least 0.7 $cm^3/g$, or at least 0.75 $cm^3/g$, or at least 0.8 $cm^3/g$, at least 0.85 $cm^3/g$, or at least 0.9 $cm^3/g$, or at least 0.95 $cm^3/g$, or at least 1 $cm^3/g$. The use of high porosity conductive particles may be advantageous since it allows a larger amount of silicon to be accommodated within the pore structure.

The internal pore volume of the porous conductive particles is suitably capped at a value at which increasing fragility of the porous conductive particles outweighs the advantage of increased pore volume accommodating a larger amount of silicon. Preferably, the total volume of micropores and mesopores in the porous conductive particles is no more than 2 $cm^3/g$, or no more than 1.8 $cm^3/g$, or no more than 1.6 $cm^3/g$, or no more than 1.5 $cm^3/g$, or no more than 1.45 $cm^3/g$, or no more than 1.4 $cm^3/g$, or no more than 1.35 $cm^3/g$, or no more than 1.3 $cm^3/g$, or no more than 1.25 $cm^3/g$, or no more than 1.2 $cm^3/g$.

In some examples, the total volume of micropores and mesopores in the porous conductive particles may be in the range from 0.7 to 2.2 $cm^3/g$, or in the range from 0.7 to 2 $cm^3/g$, or in the range from 0.8 to 2 $cm^3/g$, range from 0.8 to 1.8 $cm^3/g$, or in the range from 0.9 to 1.8 $cm^3/g$, or in the range from 0.9 to 1.6 $cm^3/g$, or in the range from 1 to 1.6 $cm^3/g$, or in the range from 1.1 to 1.6 $cm^3/g$.

In other examples, the total volume of micropores and mesopores in the porous conductive particles may be in the range from 0.4 to 0.75 $cm^3/g$, or from 0.4 to 0.7 $cm^3/g$, or from 0.4 to 0.65 $cm^3/g$, 0.45 to 0.75 $cm^3/g$, or from 0.45 to 0.7 $cm^3/g$, or from 0.45 to 0.65 $cm^3/g$, or from 0.45 to 0.6 $cm^3/g$.

In other examples, the total volume of micropores and mesopores in the porous conductive particles may be in the range from 0.6 to 2 $cm^3/g$, or from 0.6 to 1.8 $cm^3/g$, or from 0.7 to 1.8 $cm^3/g$, or from 0.7 to 1.6 $cm^3/g$, or from 0.8 to 1.6 $cm^3/g$, or from 0.8 to 1.5 $cm^3/g$, or from 0.8 to 1.4 $cm^3/g$, or from 0.9 to 1.5 $cm^3/g$, or from 0.9 to 1.4 $cm^3/g$, or from 1 to 1.4 $cm^3/g$.

The general term "$PD_n$ pore diameter" refers herein to the volume-based nth percentile pore diameter, based on the total volume of micropores and mesopores. For instance, the term "$PD_{90}$ pore diameter" as used herein refers to the pore diameter below which 90% of the total micropore and mesopore volume is found). Similarly, the term "$PD_{50}$ pore diameter" as used herein refers to the volume-based median pore diameter, based on the total volume of micropores and mesopores (i.e. the pore diameter below which 50% of the total micropore and mesopore volume is found). Therefore, in accordance with the invention, at least 50% of the total volume of micropores and mesopores is preferably in the form of pores having a diameter of less than 8 nm.

The $PD_{50}$ pore diameter of the porous conductive particles is preferably no more than 8 nm, or no more than 6 nm, or no more than 5 nm, or no more than 4 nm, or no more than 3 nm, or no more than 2.5 nm, or no more than 2 nm, or no more than 1.5 nm. Therefore, in accordance with the invention, at least 50% of the total volume of micropores and mesopores is preferably in the form of pores having a diameter of less than 8 nm.

The $PD_{90}$ pore diameter of the porous conductive particles is at least 3 nm and less 12 nm. It has been found that if the $PD_{90}$ value is too low then it is not possible to deposit silicon into micropores and silicon instead deposits on the external surfaces of the porous conductive particles. However, if the $PD_{90}$ value is too high, then excessive deposits of coarse silicon and/or excessive native oxide formation may be formed.

For the avoidance of doubt, any macropore volume (pore diameter greater than 50 nm) is not taken into account for the purpose of determining $PD_{50}$ values.

The volumetric ratio of micropores to mesopores in the porous conductive particles may range in principle from 100:0 to 0:100. Preferably, the volumetric ratio of micropores to mesopores is from 90:10 to 55:45, or from 90:10 to 60:40, or from 85:15 to 65:35.

The pore size distribution of the porous conductive particles may be monomodal, bimodal or multimodal. As used herein, the term "pore size distribution" relates to the distribution of pore size relative to the cumulative total internal pore volume of the porous conductive particles. A bimodal or multimodal pore size distribution may be preferred since close proximity between micropores and pores of larger diameter provides the advantage of efficient ionic transport through the porous network to the silicon.

The total volume of micropores and mesopores and the pore size distribution of micropores and mesopores are determined using nitrogen gas adsorption at 77 K down to a relative pressure $p/p_0$ of $10^{-6}$ using quenched solid density functional theory (QSDFT) in accordance with standard methodology as set out in ISO 15901-2 and ISO 15901-3. Nitrogen gas adsorption is a technique that characterises the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system.

Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA, and the Autosorb IQ porosity analyzers, which are available from Quantachrome Instruments.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm (i.e. only for micropores and mesopores). $PD_{50}$ are likewise determined relative to the total volume of micropores and mesopores only.

In view of the limitations of available analytical techniques it is not possible to measure pore volumes and pore size distributions across the entire range of micropores, mesopores and macropores using a single technique. In the case that the porous conductive particles comprise macropores, the volume of pores having diameter in the range from greater than 50 nm and up to 100 nm may be measured by mercury porosimetry and is preferably no more than 0.3 $cm^3/g$, or no more than 0.20 $cm^3/g$, or no more than 0.1 $cm^3/g$, or no more than 0.05 $cm^3/g$. A small fraction of macropores may be useful to facilitate electrolyte access into the pore network, but the advantages of the invention are obtained substantially by accommodating silicon in micropores and smaller mesopores.

Any pore volume measured by mercury porosimetry at pore sizes of 50 nm or below is disregarded (as set out above, nitrogen adsorption is used to characterize the mesopores and micropores). Pore volume measured by mercury porosimetry above 100 nm is assumed for the purposes of the invention to be inter-particle porosity and is also disregarded.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension $\gamma$ taken to be 480 mN/m and the contact angle $\varphi$ taken to be 140° for mercury at room temperature. The density of mercury is taken to be 13.5462 $g/cm^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

It will be appreciated that intrusion techniques such as gas adsorption and mercury porosimetry are effective only to determine the pore volume of pores that are accessible to nitrogen or to mercury from the exterior of the porous conductive particles. Porosity values specified herein shall be understood as referring to the volume of open pores, i.e. pores that are accessible to a fluid from the exterior of the porous conductive particles. Fully enclosed pores which cannot be identified by nitrogen adsorption or mercury porosimetry shall not be taken into account herein when determining porosity values. Likewise, any pore volume located in pores that are so small as to be below the limit of detection by nitrogen adsorption is not taken into account.

The porous conductive particles are preferably porous carbon particles. The porous carbon particles preferably comprise at least 80 wt % carbon, more preferably at least 90 wt % carbon, more preferably at least 95 wt % carbon, and optionally at least 98 wt % or at least 99 wt % carbon. The carbon may be crystalline carbon or amorphous carbon, or a mixture of amorphous and crystalline carbon. The porous carbon particles may be either hard carbon particles or soft carbon particles.

As used herein, the term "hard carbon" refers to a disordered carbon matrix in which carbon atoms are found predominantly in the $sp^2$ hybridised state (trigonal bonds) in nanoscale polyaromatic domains. The polyaromatic domains are cross-linked with a chemical bond, e.g. a C—O—C bond. Due to the chemical cross-linking between the polyaromatic domains, hard carbons cannot be converted to graphite at high temperatures. Hard carbons have graphite-like character as evidenced by the large G-band (~1600 $cm^{-1}$) in the Raman spectrum. However, the carbon is not fully graphitic as evidenced by the significant D-band (~1350 $cm^{-1}$) in the Raman spectrum.

As used herein, the term "soft carbon" also refers to a disordered carbon matrix in which carbon atoms are found predominantly in the $sp^2$ hybridised state (trigonal bonds) in polyaromatic domains having dimensions in the range from 5 to 200 nm. In contrast to hard carbons, the polyaromatic domains in soft carbons are associated by intermolecular forces but are not cross-linked with a chemical bond. This means that they will graphitise at high temperature. The porous carbon particles preferably comprise at least 50% $sp^2$ hybridised carbon as measured by XPS. For example, the porous carbon particles may suitably comprise from 50% to 98% $sp^2$ hybridised carbon, from 55% to 95% $sp^2$ hybridised carbon, from 60% to 90% $sp^2$ hybridised carbon, or from 70% to 85% $sp^2$ hybridised carbon.

A variety of different materials may be used to prepare suitable porous carbon frameworks. Examples of organic materials that may be used include plant biomass including lignocellulosic materials (such as coconut shells, nut shells rice husks, wood etc.) and fossil carbon sources such as coal. Examples of resins and polymeric materials which form porous carbon particles on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, $\alpha$-olefins, vinyl pyrrolidone and other ethylenically unsaturated monomers. A variety of different carbon materials are available in the art depending on the starting material and the conditions of the pyrolysis process. Porous carbon particles of various different specifications are available from commercial suppliers.

The porous carbon particles may undergo a chemical or gaseous activation process to increase the volume of mesopores and micropores. A suitable activation process comprises contacting pyrolyzed carbon with one or more of oxygen, steam, CO, $CO_2$ and KOH at a temperature in the range from 600 to 1000° C.

Mesopores can also be obtained by known templating processes, using extractable pore formers such as MgO and other colloidal or polymer templates which can be removed by thermal or chemical means post pyrolysis or activation.

Alternatives to carbon-based conductive particles include porous metal oxides, such as oxides of titanium having the formula $TiO_x$ where x has a value greater than 1 and less than 2.

The porous conductive particles preferably have a BET surface area of at least 750 $m^2/g$, or at least 1,000 $m^2/g$, or at least 1,250 $m^2/g$, or at least 1,500 $m^2/g$. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. Preferably, the BET surface area of the porous conductive particles is no more than 4,000 $m^2/g$, or no more than 3,500 $m^2/g$, or no more than 3,250 $m^2/g$, or no more than 3,000 $m^2/g$.

The porous conductive particles preferably have a particle density in the range from 0.35 to 1.2 $g/cm^3$. As used herein, the term "particle density" refers to "apparent particle density" as measured by mercury porosimetry (i.e. the mass of a particle divided by the particle volume wherein the particle volume is taken to be the sum of the volume of solid material and any closed or blind pores (a "blind pore" is pore that is too small to be measured by mercury porosimetry)). In general, the particulate additives used in the present invention have a low BET surface area and thus a relatively low volume of open pores. Accordingly, the apparent density as measured by mercury porosimetry is a close approximation to the "effective particle density" (the calculation of which includes the volume of open pores). Preferably, the porous conductive particles have particle density of at least 0.4 g/cm$^3$, or at least 0.45 g/cm$^3$, or at least 0.5 g/cm$^3$, or at least 0.55 g/cm$^3$, or at least 0.6 g/cm$^3$, or at least 0.65 g/cm$^3$, or at least 0.7 g/cm$^3$. Preferably, the porous conductive particles have particle density of no more than 1.15 g/cm$^3$, or no more than 1.1 g/cm$^3$, or no more than 1.05 g/cm$^3$, or no more than 1 g/cm$^3$, or no more than 0.95 g/cm$^3$, or no more than 0.9 g/cm$^3$.

The particulate additive may in principle be selected from any particulate material having $D_{50}$ particle diameter in the range from 40 to 300 µm, particle density in the range from 1.3 to 6 g/cm$^3$ and BET surface area of no more than 200 m$^2$/g. It is also preferred that the particulate additive is chemically inert in the presence of the fluidizing gas under the conditions of the CVI reaction. It is furthermore preferred that the particulate additive is also compatible with the other components of an electrode composition. Although it is preferred that the particulate additive is removed prior to incorporation of the composite particles into an electrode, removal may not be necessary in all circumstances. In addition, it is possible that minor amounts of particulate additive material may remain in the composite particles even after the bulk of the particulate additive has been removed. For instance, inseparable fine particles may in some cases be formed by attrition between particles in the fluidized bed reactor.

Suitable materials include silicon dioxide (silica); sand; aluminosilicates; metal oxides such as titanium dioxide, zirconium dioxide, aluminium oxide, and yttrium oxide; carbonates, nitrides, carbides, mineral powders, zeolites, solid electrolytes, ceramics, glass, carbon and mixtures thereof. However, various other materials may be used and may readily be selected by the skilled person.

Optionally, the $D_{50}$ particle diameter of the particulate additive may be at least 50 µm, or at least 60 µm, or at least 70 µm, or at least 80 µm, or at least 90 µm, or at least 100 µm.

Optionally, the $D_{50}$ particle diameter of the particulate additive may be no more than 280 µm, or no more than 260 µm, or no more than 240 µm, or no more than 220 µm, or no more than 200 µm.

For instance, the particulate additive may have a $D_{50}$ particle diameter in the range from 40 to 280 µm, or from 50 to 280 µm, or from 50 to 260 µm, or from 60 to 260 µm, or from 60 to 240 µm, or from 70 to 240 µm, or from 80 to 240 µm, or from 80 to 220 µm, or from 90 to 220 µm, or from 90 to 200 µm, or from 100 to 200 µm.

The $D_{10}$ particle diameter of the particulate additive is preferably at least 40 µm, or at least 50 µm, or at least 60 µm, or at least 70 µm, or at least 80 µm. This avoids operation in the presence of a large amount of small particles of the particulate additive, which have only a limited capacity to improve fluidization behaviour.

More preferably, the $D_1$ particle diameter of the particulate additive is at least 40 µm, or at least 50 µm, or at least 60 µm, or at least 70 µm, or at least 80 µm.

The $D_{10}$ particle diameter of the particulate additive is preferably at least 5 µm greater than the $D_{90}$ particle diameter of the porous conductive particles, more preferably at least 10 µm greater, or at least 15 µm greater, or at least 20 µm greater, at least 25 µm greater. This facilitates separation of the composite particles from the particulate additive after completion of step (c).

More preferably, the $D_1$ particle diameter of the particulate additive is at least 5 µm greater than the $D_{99}$ particle diameter of the porous conductive particles, more preferably at least 10 µm greater, or at least 15 µm greater, or at least 20 µm greater, at least 25 µm greater. Control of the $D_1$ and $D_{99}$ particle sizes may suitably be achieved by a sieving process.

Preferably, the particle density of the particulate additive may be at least 1.5 g/cm$^3$, or at least 1.8 g/cm$^3$, or at least 2 g/cm$^3$, or at least 2.2 g/cm$^3$, or at least 2.5 g/cm$^3$. Preferably, the particle density of the particulate additive may be no more than 5.8 g/cm$^3$, or no more than 5.5 g/cm$^3$, or no more than 5.2 g/cm$^3$, or no more than 5 g/cm$^3$, or no more than 4.8 g/cm$^3$, or no more than 4.5 g/cm$^3$, or no more than 4.2 g/cm$^3$, or no more than 4 g/cm$^3$.

Preferably, the BET surface area of the particulate additive is no more than 150 m$^2$/g, or no more than 120 m$^2$/g, or no more than 100 m$^2$/g, or no more than 80 m$^2$/g, or no more than 60 m$^2$/g, or no more than 40 m$^2$/g, or no more than 20 m$^2$/g. As described above, low surface area of the particulate additive results in improved fluidization behaviour and also reduces the possibility of silicon deposition onto the particulate additive instead of the porous conductive particles. For reasons of economy, it is preferred that the amount of silicon deposited onto the particulate additive is no more than 10 wt % of the amount of silicon in the composite particles obtained from step (c).

The mass ratio of the porous conductive particles to the particulate additive is preferably from 95:5 to 75:25; or from 92:8 to 80:20; or from 90:10 to 82:18; or from 90:10 to 85:15.

Step (c) is suitably carried out at a reaction temperature in the range from 400 to 1,250° C., or 400 to 1000° C., or 400 to 800° C., or 400 to 700° C., or 400 to 750° C., or 400 to 650° C., or 400 to 600° C., or 400 to 550° C., or 400 to 500° C., or 400 to 450° C., or 450 to 500° C., or 420 to 460° C.

The fluidizing gas preferably comprises the silicon precursor gas diluted with an inert carrier gas (e.g. comprising nitrogen, hydrogen or argon). More preferably, the fluidizing gas comprises from 0.5 to 20 vol %, or from 1 to 10 vol %, or from 1 to 5 vol % of the silicon precursor gas, with the balance made up of the inert carrier gas. The CVI process is suitably carried out at low partial pressure of silicon precursor with total pressure of 101.3 kPa (i.e. 1 atm), the remaining partial pressure made up to atmospheric pressure using the inert carrier gas. Suitable silicon precursor gases include silane (SiH$_4$), silane derivatives (e.g. disilane, trisilane and tetrasilane), and chlorosilanes (e.g. trichlorosilane (SiHCl$_3$)). Silane is a preferred silicon precursor gas.

The fluidizing gas may optionally further comprise one or more dopant precursor gases. When the dopant is boron, suitable gaseous dopant precursors include borane (BH$_3$), diborane (B$_2$H$_6$), triisopropyl borate ([(CH$_3$)$_2$CHO]$_3$B), triphenylborane ((C$_6$H$_5$)$_3$B), and tris(pentafluorophenyl)borane (C$_6$F$_5$)$_3$B, preferably diborane. When the dopant is phosphorus, a suitable gaseous dopant precursor is phosphine (PH$_3$). Preferably, the dopant-precursor gases are present in an amount of no more than 2 vol % of the amount of silicon precursor gas.

The porous conductive particles and the particulate additive may be combined either upstream of the fluidized bed reactor, or the porous conductive particles and the particulate additive may be added separately into the fluidized bed reactor. The process may be carried out continuously or discontinuously and step (c) may further comprise one or more of mechanical vibration of the fluidized bed, acoustic vibration of the fluidized bed, and pulsed flow of the fluidizing gas.

The process of the invention may optionally comprise a step of separating the composite particles from some or all of the particulate additive. Various techniques for the classification of particles by size may be used for this purpose, for example sieving, sedimentation or elutriation.

A range of different silicon loadings in the composite particles may be obtained using the process of the invention. For example, the amount of silicon in the composite particles may be selected such that at least 25% and as much as 80% or more of the internal pore volume of the porous conductive particles is occupied by silicon following step (c). For example, the silicon may occupy from 25% to 60%, or from 25% to 55%, or from 25% to 50%, or from 25% to 45%, or from 25% to 40% of the internal pore volume of the porous conductive particles. Within these preferred ranges, the pore volume of the porous conductive particles is effective to accommodate expansion of the silicon during charging and discharging, but avoids excess pore volume which does not contribute to the volumetric capacity of the particulate particles. However, the amount of silicon is also not so high as to impede effective lithiation due to inadequate metal-ion diffusion rates or due to inadequate expansion volume resulting in mechanical resistance to lithiation.

The amount of silicon in the porous conductive particles can be correlated to the available pore volume by the requirement that the mass ratio of silicon to the porous conductive particles is in the range from $[0.5 \times P^1$ to $1.6 \times P_1]$: 1, or in the range from $[0.5 \times P^1$ to $1.3 \times O_1]$: 1, wherein $P_1$ is a dimensionless quantity having the magnitude of the total pore volume of micropores and mesopores in the porous conductive particles, as expressed in $cm^3/g$ (e.g. if the porous carbon particles have a total volume of micropores and mesopores of 1.2 $cm^3/g$, then $P_1=1.2$). This relationship takes into account the density of silicon and the pore volume of the porous conductive particles to define a weight ratio of silicon at which the pore volume is around 20% to 70% occupied, or around 20% to 55% occupied.

Preferably at least 90 wt %, more preferably at least 95 wt %, even more preferably at least 98 wt % of the silicon mass in the composite particles is located within the internal pore volume of the porous conductive particles such that there is no or very little silicon located on the external surfaces of the composite particles. The reaction kinetics of the CVI process ensure that preferential deposition of silicon occurs on internal surfaces of the porous conductive particles.

The composite particles can be further characterised by their performance under thermogravimetric analysis (TGA) in air. Preferably the composite particles contain no more than 10% unoxidised silicon at 800° C. (also referred to herein as "coarse silicon") as determined by TGA in air with a temperature ramp rate of 10° C./min. More preferably the composite particles contain no more than 5% or no more than 2% unoxidised silicon at 800° C. as determined by TGA in air with a temperature ramp rate of 10° C./min.

The determination of the amount of unoxidised silicon is derived from the characteristic TGA trace for these materials. A mass increase at ca. 300-500° C. corresponds to initial oxidation of silicon to $SiO_2$, and is followed by mass loss at ca. 500-600° C. as carbon is oxidised to $CO_2$ gas. Above ca. 600° C., there is a further mass increase corresponding to the continued conversion of silicon to $SiO_2$ which increases toward an asymptotic value above 1000° C. as silicon oxidation goes to completion.

For the purposes of this analysis, it is assumed that any mass increase above 800° C. corresponds to the oxidation of silicon to $SiO_2$ and that the total mass at completion of oxidation is $SiO_2$. This allows the percentage of unoxidised silicon at 800° C. as a proportion of the total amount of silicon to be determined according to the following formula:

$$Z=1.875\times[(M_f-M_{800})/M_f]\times100\%$$

Wherein $Z$ is the percentage of unoxidised silicon at 800° C., $M_f$ is the mass of the sample at completion of oxidation at 1400° C. and $M_{800}$ is the mass of the sample at 800° C. For the purposes of this analysis, it is assumed that any mass increase above 800° C. corresponds to the oxidation of silicon to $SiO_2$ and that the total mass at completion of oxidation is $SiO_2$. For completeness, it will be understood that 1.875 is the molar mass ratio of $SiO_2$ to $O_2$ (i.e. the mass ratio of $SiO_2$ formed to the mass increase due to the addition of oxygen).

Without being bound by theory, it is understood that the temperature at which silicon is oxidised under TGA corresponds broadly to the length scale of the oxide coating on the silicon due to diffusion of oxygen atoms through the oxide layer being thermally activated. The size of the silicon nanostructure and its location limit the length scale of the oxide coating thickness. Therefore, it is understood that silicon deposited in micropores and mesopores will oxidise at a lower temperature than deposits of silicon on a particle surface due to the necessarily thinner oxide coating existing on these structures. Accordingly, composite particles according to the invention exhibit substantially complete oxidation of silicon at low temperatures consistent with the small length scale of silicon nanostructures that are located in micropores and smaller mesopores. For the purposes of the invention, silicon oxidation at 800° C. is assumed to be silicon on the external surfaces of the porous conductive particle framework.

The amount of silicon in the composite particles can be determined by elemental analysis. Preferably, elemental analysis is used to determine the weight percentage of carbon (and optionally hydrogen, nitrogen and oxygen) in the porous carbon particles alone and in the silicon-containing composite particles. Determining the weight percentage of carbon in the in the porous carbon particles alone takes account of the possibility that the porous carbon particles contain a minor amount of heteroatom. Both measurements taken together allow the weight percentage of silicon relative to the porous carbon particles to be determined reliably.

The silicon content is preferably determined by ICP-OES (Inductively coupled plasma-optical emission spectrometry). A number of ICP-OES instruments are commercially available, such as the iCAP® 7000 series of ICP-OES analysers available from ThermoFisher Scientific. The carbon content of the composite particles and of the porous carbon particles alone (as well as the hydrogen, nitrogen and oxygen content if required) are preferably determined by IR absorption. A suitable instrument for determining carbon, hydrogen, nitrogen and oxygen content is the TruSpec® Micro elemental analyser available from Leco Corporation.

The composite particles preferably have a low total oxygen content. Oxygen may be present in the composite particles for instance as part of the porous conductive particles or as an oxide layer on any exposed silicon surfaces. Preferably, the total oxygen content of the composite particles is less than 15 wt %, more preferably less than 10 wt %, more preferably less than 5 wt %, for example less than 2 wt %, or less than 1 wt %, or less than 0.5 wt %.

The silicon-containing composite particles preferably have a BET surface area of no more than 300 m²/g, or no more than 250 m²/g, or no more than 200 m²/g, or no more than 150 m²/g, or no more than 100 m²/g, or no more than 80 m²/g, or no more than 60 m²/g, or no more than 40 m²/g, or no more than 30 m²/g, or no more than 25 m²/g, or no more than 20 m²/g, or no more than 15 m²/g, or no more than 10 m²/g. In general, a low BET surface area is preferred in order to minimize the formation of solid electrolyte interphase (SEI) layers at the surface of the composite particles during the first charge-discharge cycle of an anode. However, a BET surface area which is excessively low results in unacceptably low charging rate and capacity due to the inaccessibility of the bulk of the electroactive material to metal ions in the surrounding electrolyte. For instance, the BET surface area is preferably at least 0.1 m²/g, or at least 1 m²/g, or at least 2 m²/g, or at least 5 m²/g. For instance, the BET surface area may be in the range from 1 m²/g to 25 m²/g, more preferably in the range from 2 to 15 m²/g.

The silicon-containing composite particles preferably have a specific charge capacity on first lithiation of 1200 to 2340 mAh/g. Preferably the silicon-containing composite particles have a specific charge capacity on first lithiation of at least 1400 mAh/g.

The process of the invention may further comprise a step of depositing a conductive carbon coating onto the silicon-containing composite particles. A conductive carbon coating may be obtained by a chemical vapour deposition (CVD) method, i.e. by thermal decomposition of a volatile carbon-containing gas (e.g. ethylene) onto the surface of the silicon-containing composite particles. The deposition of the conductive carbon coating by CVD may optionally be carried out in the same fluidized bed reactor as step (c), for example by changing the composition of the fluidizing gas to replace the silicon precursor gas used in step (c) for a carbon-containing gas. Alternatively, the carbon coating may be formed by depositing a solution of a carbon-containing compound onto the surface of the composite particles followed by pyrolysis.

A carbon coating has the advantages that it further reduces the BET surface area of the composite particles by smoothing any surface defects and by filling any remaining surface microporosity, thereby further reducing first cycle loss. In addition, a carbon coating improves the conductivity of the surface of the composite particles, reducing the need for conductive additives in the electrode composition, and also creates an optimum surface for the formation of a stable SEI layer, resulting in improved capacity retention on cycling. When a carbon coating is present, the silicon-containing composite particles preferably have a BET surface area of no more than 150 m²/g, or no more than 100 m²/g, or no more than 80 m²/g, or no more than 60 m²/g, or no more than 40 m²/g, or no more than 30 m²/g, or no more than 25 m²/g, or no more than 20 m²/g, or no more than 15 m²/g, or no more than 10 m²/g.

In a second aspect of the invention, there is provided a composition comprising or consisting silicon-containing composite particles obtainable by a process according to the first aspect of the invention.

In a third aspect, the invention provides an electrode comprising silicon-containing composite particles obtainable by a process according to the first aspect of the invention in electrical contact with a current collector.

In a fourth aspect, the present invention provides a rechargeable metal-ion battery comprising an electrode according to the third aspect of the invention.

EXAMPLE 1

A fluidized bed reactor was fabricated with a 0.95 cm (⅜") stainless steel gas inlet and 60 mm outside diameter (O.D.) tubular section with length of 520 mm. A stainless steel expanded head was fabricated with an O.D. of 100 mm. The reactor was suspended from a frame and a vertically-oriented tube furnace was positioned such that the hot zone ran from the conical section to ¾ of the length of the cylindrical section (approx. 380 mm long). A flanged lid was built for the top with tapped ports for thermocouples, gas outlet and powder dosing. The furnace was dosed with 50 g of a pre-mixed mixture of porous carbon particles (BET surface area 1673 m²/g, total pore volume: 0.77 cm³/g, micropore volume 73 vol %, $D_1$ 0.86 μm, $D_{10}$ 1.86 μm, $D_{50}$ 5.1 μm, $D_{98}$ 12.5 μm particle density 0.82 g/cm³) and silica particles (BET 32.3 m²/g, $D_1$ 54.4 μm, $D_{10}$ 70.6 μm, $D_{50}$ 106 μm, $D_{98}$ 190 μm, particle density 1830 kg/m³) in the ratio 3:1 by weight (i.e. 25 wt % of silica).

The minimum fluidization velocity was determined with a cold-flow pressure-drop test with nitrogen as an inert gas, ramping gas flow rate between 1 to 2.5 L/min. Once minimum fluidizing velocity was determined, the inert gas flow rate was held constant at or above the minimum fluidising velocity. The furnace was ramped to the desired reaction temperature under constant inert gas flow rate. After stabilizing at a target temperature between 450-500° C., the fluidizing gas was switched from pure nitrogen to 1.25 vol % monosilane in nitrogen. The reaction progress was monitored by measuring pressure drop and furnace temperature difference between top and bottom. The gas flow rate was adjusted throughout the run to maintain a pressure drop consistent with continued fluidization and minimum temperature difference between the top and bottom of the bed of less than 40° C. was maintained.

The reaction was run for 12 hours. Once the reaction time was complete, the fluidizing gas was then switched to pure nitrogen whilst maintaining fluidisation, this purge lasted 30 minutes. Then the furnace was ramped to ambient temperature over several hours. On reaching ambient temperature, the furnace atmosphere was switched to air gradually over a period of hours. The sample was finally unloaded through the gas feed tube at the bottom as a grey free flowing powder. The silica particles were then removed from the silicon-carbon composite particle product by using a 20 μm sieve.

The results of ICP-OES analysis show that the silicon-carbon composite particle product contained 51.3 wt % of silicon with minimal coarse silicon (Z<5 wt %). The Si:C ratio was therefore approximately 1:1. The BET surface area of the product was 156 m²/g.

EXAMPLE 2

The process of Example 1 was repeated except that the reactor was dosed with 50 g of the porous carbon particles alone, without any silica particles. It was found that a significant amount of the carbon material was elutriated from the reactor (exited the reactor before the deposition process was complete). After deposition was completed the resulting composite powder (excluding the elutriated material) was analysed and found to comprise an excess loading of silicon at 80.6 wt % and a large value of coarse silicon (Z>10 wt %). The BET of the product was 29 $m^2/g$. Agglomeration of composite particles was also observed in SEM images.

The invention claimed is:

1. A process for preparing silicon-containing composite particles in a fluidized bed, the process comprising the steps of:

(a) providing a plurality of porous conductive particles comprising micropores and/or mesopores, wherein:

(i) the $D_{50}$ particle diameter of the porous conductive particles is in the range from 1 to 30 μm, (ii) the total pore volume of micropores and mesopores as measured by gas adsorption is in the range from 0.4 to 2.2 $cm^3/g$;

(iii) the $PD_{50}$ pore diameter as measured by gas adsorption is no more than 10 nm;

(b) combining the porous conductive particles with a particulate additive in the form of a particulate material having a $D_{50}$ particle diameter in the range from 40 to 300 μm, particle density in the range from 1.3 to 6 $g/cm^3$ and BET surface area of no more than 200 $m^2/g$, wherein the mass ratio of the porous conductive particles to the particulate additive is from 95:5 to 70:30; and (c) passing a fluidizing gas comprising a silicon precursor gas through the combined porous conductive particles and particulate additive at a gas velocity effective to cause fluidization of the combined porous conductive particles and particulate additive, and at a temperature effective to cause deposition of silicon in the pores of the porous conductive particles.

2. A process according to claim 1, wherein the porous conductive particles are porous carbon particles.

3. A process according to claim 1, wherein the porous conductive particles have a $D_{50}$ particle diameter of at least 1.5 μm and no more than 25 μm.

4. A process according claim 1, wherein the porous conductive particles have a $D_{10}$ particle diameter of at least 0.2 μm and a $D_{99}$ particle diameter of no more than 40 μm.

5. A process according to claim 1, wherein the porous conductive particles have a particle size distribution span of 5 or less.

6. A process according to claim 1, wherein the porous conductive particles have a total volume of micropores and mesopores of at least 0.45 $cm^3/g$ and no more than 2 $cm^3/g$.

7. A process according to claim 1, wherein the $PD_{50}$ pore diameter of the porous conductive particles is no more than 8 nm.

8. A process according to claim 1, wherein the volumetric ratio of micropores to mesopores is from 90:10 to 55:45.

9. A process according to claim 1, wherein the porous conductive particles have a particle density in the range from 0.35 to 1.2 $g/cm^3$.

10. A process according to claim 1, wherein the particulate additive is selected from silicon dioxide; sand; aluminosilicates; metal oxides, titanium oxide, zirconium dioxide, aluminium oxide, yttrium oxide, carbonates, nitrides, carbides, mineral powders, zeolites, solid electrolytes, ceramics, glass, carbon and mixtures thereof.

11. A process according to claim 1, wherein the particulate additive has a $D_{50}$ particle diameter of at least 50 μm and no more than 280 μm.

12. A process according to claim 1, wherein the particulate additive has a $D_{10}$ particle diameter of at least 40 μm.

13. A process according to claim 1, wherein the particulate additive has a $D_1$ particle diameter that is at least 5 μm more than a $D_{99}$ particle diameter of the porous conductive particles.

14. A process according to claim 1, wherein the particulate additive has a particle density of at least 1.5 $g/cm^3$ and no more than 5.8 $g/cm^3$.

15. A process according to claim 1, wherein the temperature in step (c) is in the range from 400 to 1,250° C.

16. A process according to claim 1, wherein the fluidizing gas comprises the silicon precursor gas and an inert carrier gas.

17. A process according to claim 1, further comprising the step of separating the composite particles from some or all of the particulate additive.

* * * * *